US012103021B2

(12) United States Patent
Rogers

(10) Patent No.: US 12,103,021 B2
(45) Date of Patent: Oct. 1, 2024

(54) PAUSE ASSEMBLY FOR SHOWERHEADS

(71) Applicant: WATER PIK, INC., Fort Collins, CO (US)

(72) Inventor: Craig Rogers, Fort Collins, CO (US)

(73) Assignee: WATER PIK, INC., Fort Collins, CO (US)

( * ) Notice: Subject to any disclaimer, the term of this patent is extended or adjusted under 35 U.S.C. 154(b) by 395 days.

(21) Appl. No.: 16/972,680

(22) PCT Filed: Jun. 28, 2019

(86) PCT No.: PCT/US2019/039917
§ 371 (c)(1),
(2) Date: Dec. 7, 2020

(87) PCT Pub. No.: WO2020/006472
PCT Pub. Date: Jan. 2, 2020

(65) Prior Publication Data

US 2021/0245178 A1 Aug. 12, 2021

Related U.S. Application Data

(60) Provisional application No. 62/692,147, filed on Jun. 29, 2018.

(51) Int. Cl.
*B05B 1/18* (2006.01)
*B05B 1/30* (2006.01)
(Continued)

(52) U.S. Cl.
CPC .............. *B05B 1/3013* (2013.01); *B05B 1/18* (2013.01); *B05B 12/002* (2013.01); (Continued)

(58) Field of Classification Search
CPC ....... B05B 1/3013; B05B 1/18; B05B 12/002; B05B 1/1654; B05B 15/654; B05B 1/1609; B05B 1/1627; E03C 1/0408; E03C 1/08
See application file for complete search history.

(56) References Cited

U.S. PATENT DOCUMENTS 2,601,966 A * 7/1952 Busick ................ F16K 11/0787 137/625.42
4,933,999 A 6/1990 Mikiya et al.
(Continued)

FOREIGN PATENT DOCUMENTS

CN 201291168 8/2009
CN 201482637 5/2010
(Continued)

*Primary Examiner* — Qingzhang Zhou

(57) ABSTRACT

The present disclosure relates generally to a showerhead with a pause assembly. The pause assembly can be partially received within a chamber of the housing and positioned between a fluid inlet and a plurality of nozzles to permit flow or substantially reduce flow from the fluid inlet to the plurality of nozzles. The pause assembly includes a valve and a lever coupled to the valve. The lever extends from the housing and movement of the lever in the first direction moves the valve to a first position to permit flow from the fluid inlet to the plurality of nozzles and movement of the lever in a second direction moves the valve to a second position to substantially reduce flow from the fluid inlet to the plurality of nozzles.

20 Claims, 11 Drawing Sheets

(51) Int. Cl.

| | |
|---|---|
| ***B05B 12/00*** | (2018.01) |
| ***E03C 1/04*** | (2006.01) |
| *B05B 1/16* | (2006.01) |
| *B05B 15/654* | (2018.01) |

(52) U.S. Cl.
CPC .......... *E03C 1/0408* (2013.01); *B05B 1/1654* (2013.01); *B05B 15/654* (2018.02)

(56) References Cited

U.S. PATENT DOCUMENTS

| | | | | | |
|---|---|---|---|---|---|
| 5,653,260 | A * | 8/1997 | Huber | E03C 1/021 | 137/625.33 |
| 9,795,975 | B2 | 10/2017 | Luettgen et al. | | |
| 2008/0302886 | A1* | 12/2008 | Hodel | B05B 12/002 | 239/443 |
| 2010/0264345 | A1* | 10/2010 | Tips | B05B 12/0024 | 251/231 |
| 2013/0032645 | A1* | 2/2013 | Zhou | B05B 1/18 | 239/436 |
| 2018/0050353 | A1 | 2/2018 | Lin et al. | | |

FOREIGN PATENT DOCUMENTS

| | | | |
|---|---|---|---|
| CN | 202762581 | | 3/2013 |
| CN | 202893548 | | 4/2013 |
| KR | 20170087642 | | 7/2017 |
| WO | 2004061243 | | 7/2005 |
| WO | WO 2011103795 | * | 9/2011 |

* cited by examiner

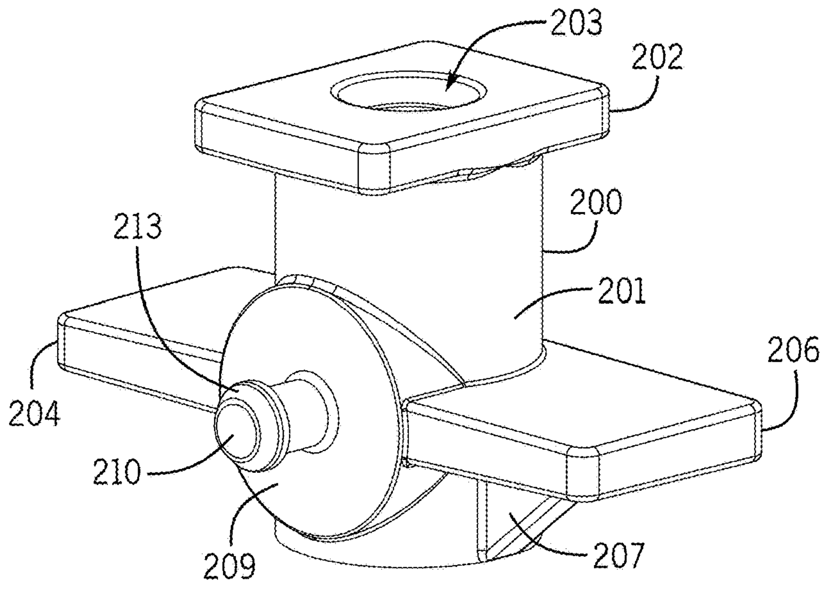
FIG. 7A
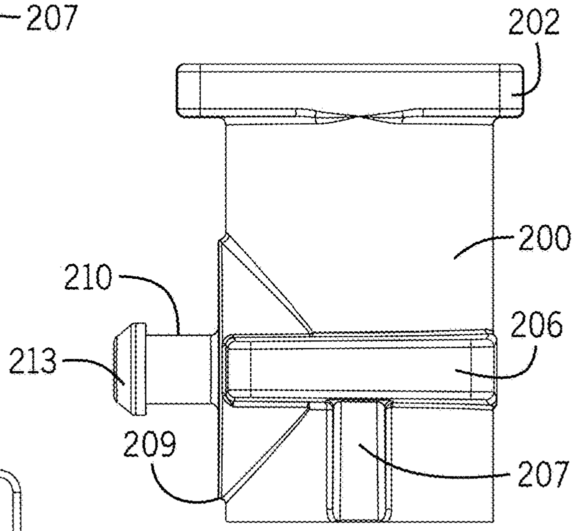
FIG. 7B
FIG. 7C
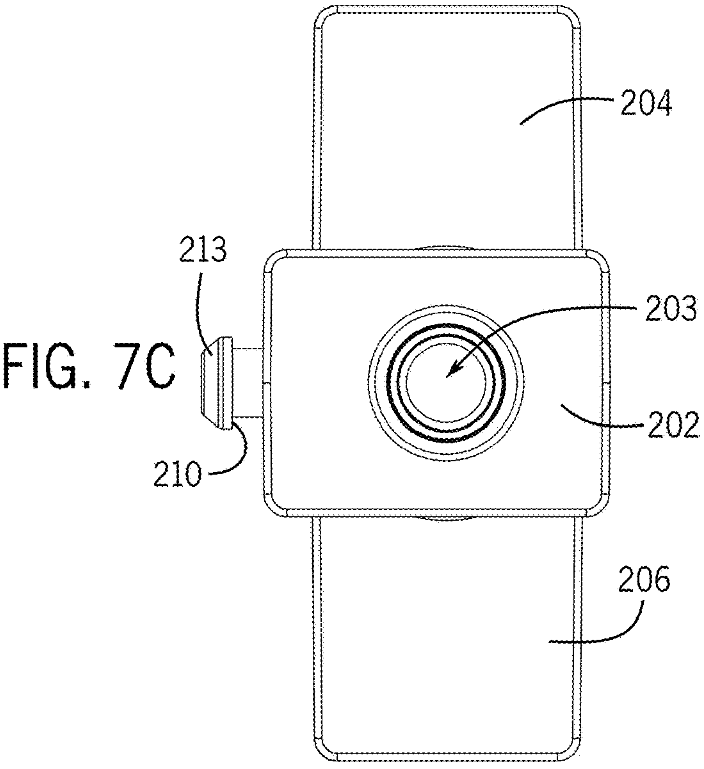

PAUSE ASSEMBLY FOR SHOWERHEADS

CROSS REFERENCE TO RELATED APPLICATIONS

This application is a national stage application under 35 U.S.C. § 371 of International Application No. PCT/US2019/039917 having an international filing date of Jun. 28, 2019, which designated the United States and claims priority under 35 U.S.C. § 120 to U.S. Provisional Application No. 62/692,147 filed on 29 Jun. 2018, entitled "Pause Assembly for Showerheads," which are incorporated by reference herein in their entireties for all purposes.

TECHNICAL FIELD

The technology described herein relates generally to showerheads, and more specifically to flow control elements for showerheads.

BACKGROUND

A showerhead may be connected to a water source by a pipe, a hose, or the like. Water typically flows to the showerhead from the water source when the water source is turned on and stops flowing to the showerhead when the water source is turned off. Generally, when the water source is turned on, there is constant water flow through the showerhead and water dispenses out of the showerhead until the water source is turned off.

Many showers have control actuators to turn the shower on, as well as adjust the water temperature of the water expired by the showerhead. These control actuators (e.g., hot/cold dials) typically are located in a separate position from the showerhead, often requiring a user to reach down and/or bend over to adjust them. Users may desire to turn the shower off during a shower to conserve water (e.g., while a user lathers shampoo, it may be desirable to turn the water off until the user is ready to rinse), but with current shower systems, a user may need to reach down to turn off the water source to stop the flow of water. With these systems, when the user turns the water back on, it may be difficult to reach the same desirable water temperature as was previously dispensed since the user must again adjust the control actuator to reach the desired temperature. This may take additional time to return the water temperature to a desirable level and may cause the user discomfort while attempting to reach the desired temperature.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein relates to a showerhead with a pause assembly that substantially pauses or reduces water flow through the showerhead. In some embodiments, the showerhead may include a housing defining a chamber in fluid communication with a fluid inlet and a plurality of nozzles, and a pause assembly at least partially received within the chamber and positioned between the fluid inlet and the plurality of nozzles to fluidly connect or disconnect the plurality of nozzles from the fluid inlet. The pause assembly may include a valve and a lever coupled to the valve and extending from the housing. Movement of the lever in a first direction may move the valve to a first position to fluidly connect the fluid inlet to the plurality of nozzles. Movement of the lever in a second direction may move the valve to a second position to fluidly disconnect the plurality of nozzles from the fluid inlet.

In another embodiment, a showerhead is disclosed. The showerhead including a housing, an engine received within the housing and positioned between a fluid inlet to the showerhead and the engine to selectively pause a water flow to the engine. The pause assembly includes a movable valve, a handle operably coupled to the movable valve, the handle extending outside of the housing and configured to be grasped by a user. A first linear direction of motion of the handle moves the movable valve in a second linear direction and motion of the handle in the second linear direction moves the movable valve in the first linear direction.

In yet another embodiment, a showerhead is disclosed including a housing defining a chamber, an engine at least partially received within the chamber and configured to dispense fluid out of a plurality of nozzles in one or more, and a pause assembly at least partially received within the chamber and fluidly connected to the engine. The pause assembly includes a valve body including an inlet fluidly connected to a water source and an outlet fluidly connected to the engine, a valve received within the valve body; and a lever coupled to the valve and extending from the housing. Movement of the lever in a first direction moves the valve to a first position to fluidly connect the inlet and the outlet and movement of the lever in a second direction moves the valve to a second position to fluidly disconnect the inlet and the outlet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 7A is an isometric view of a valve of the pause assembly of FIG. 4.

FIG. 7B is a right side elevation view of the valve of FIG. 7A.

FIG. 7C is a top plan view of the valve of FIG. 7A.

DETAILED DESCRIPTION

This disclosure is related to a showerhead including a pause or flow reduction assembly. The pause assembly includes a valve operably connected to an actuation lever that extends from the showerhead housing. The actuation lever may extend from the housing at an angle and is movable by a user to cause the valve to move from an open or flow position to a closed or paused position. The actuation lever and valve may be angled relative to one another such that a forward motion of the lever may cause an opposite rearward motion of the valve and a rearward motion of the lever may cause an opposite forward motion of the valve. In some embodiments, the valve and lever are connected via one or more ball and socket joints, where movement of at least one of the joints is constrained such that the motion of the valve and lever are limited to a single plane. The constraint allows a user to easily move the valve between open and closed positions. In one example, a first ball and socket joint connects the lever to the housing of the showerhead and a second ball and socket joint connects the lever to the valve.

The lever may extend downward and outward from the showerhead housing to allow easy access and quick action on the part of a user to pause the water flow out of the showerhead. Further, the constraint of the valve movement may further assist a user in transitioning the showerhead to the on/off or flow/no flow operations. Thus, a user can more quickly and easily adjust the state of the showerhead, even with their eyes closed (e.g., due to shampoo or soap needing to be rinsed out), as compared to conventional showerheads.

The pause assembly may also include a feedback assembly, such as a detent and spring combination that engage with a corresponding detent plate, to indicate various positions of the valve to a user. These type of feedback features within the feedback assembly also assist a user in changing the flow state of the showerhead without needing to fully view the actuator, such as when his or her eyes are closed or obstructed by shampoo or the like.

Figure 1A:
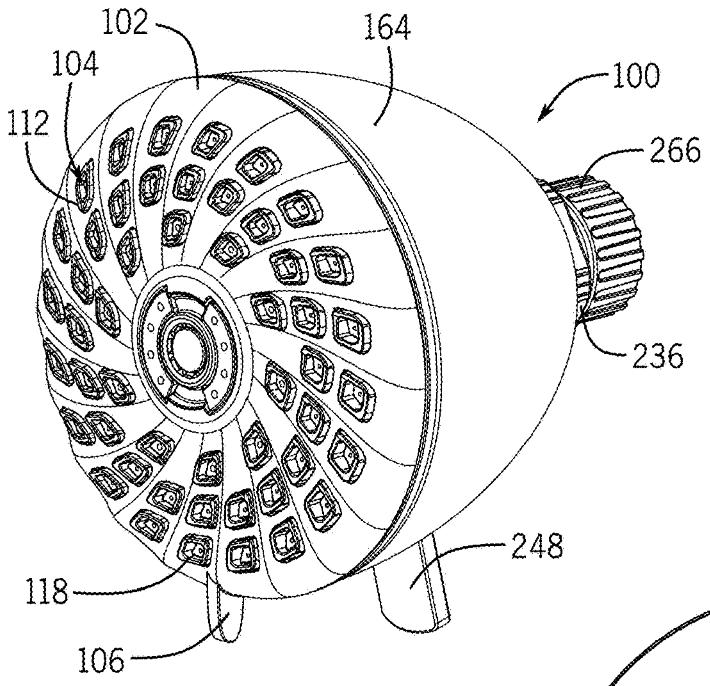
FIG. 1A is a front isometric view of a showerhead including a pause assembly.
Figure 1B:
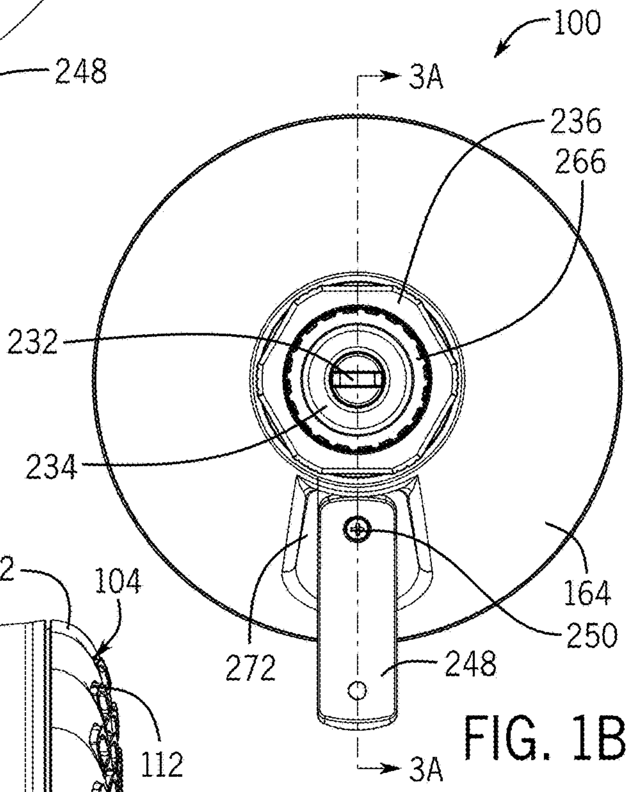
FIG. 1B is a rear elevation view of the showerhead of FIG. 1A.
Figure 1C:
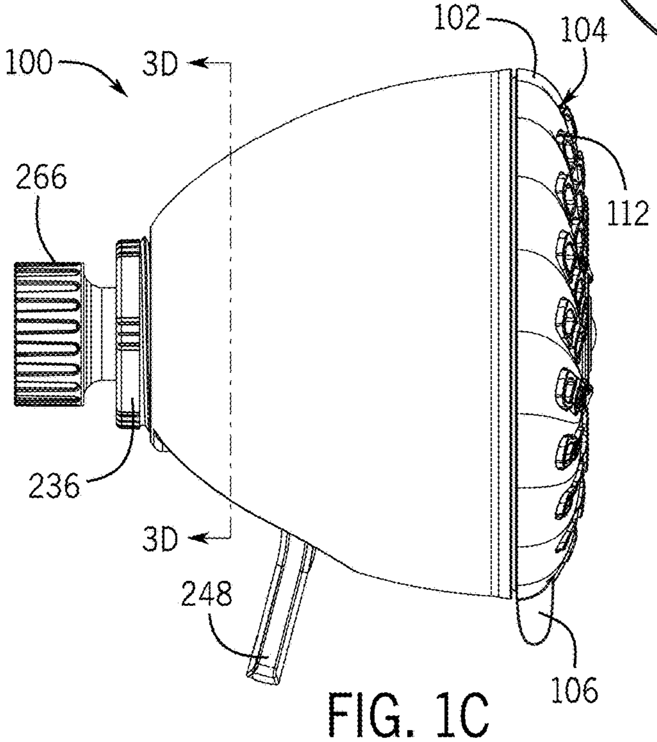
FIG. 1C is a side elevation view of the showerhead of FIG. 1A.
Figure 2:
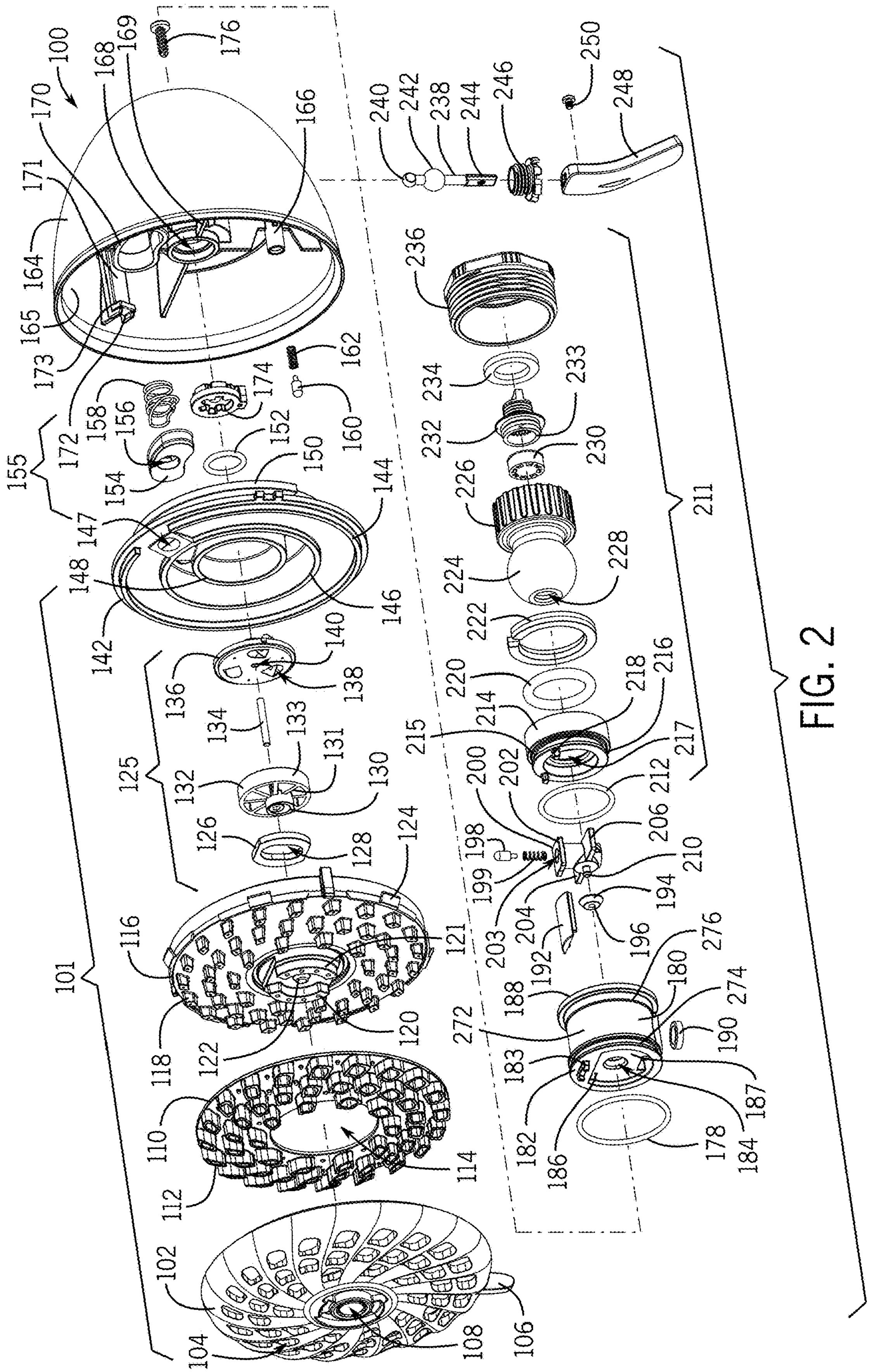
FIG. 2 is an exploded view of the showerhead of FIG. 1A.
Figure 3A:
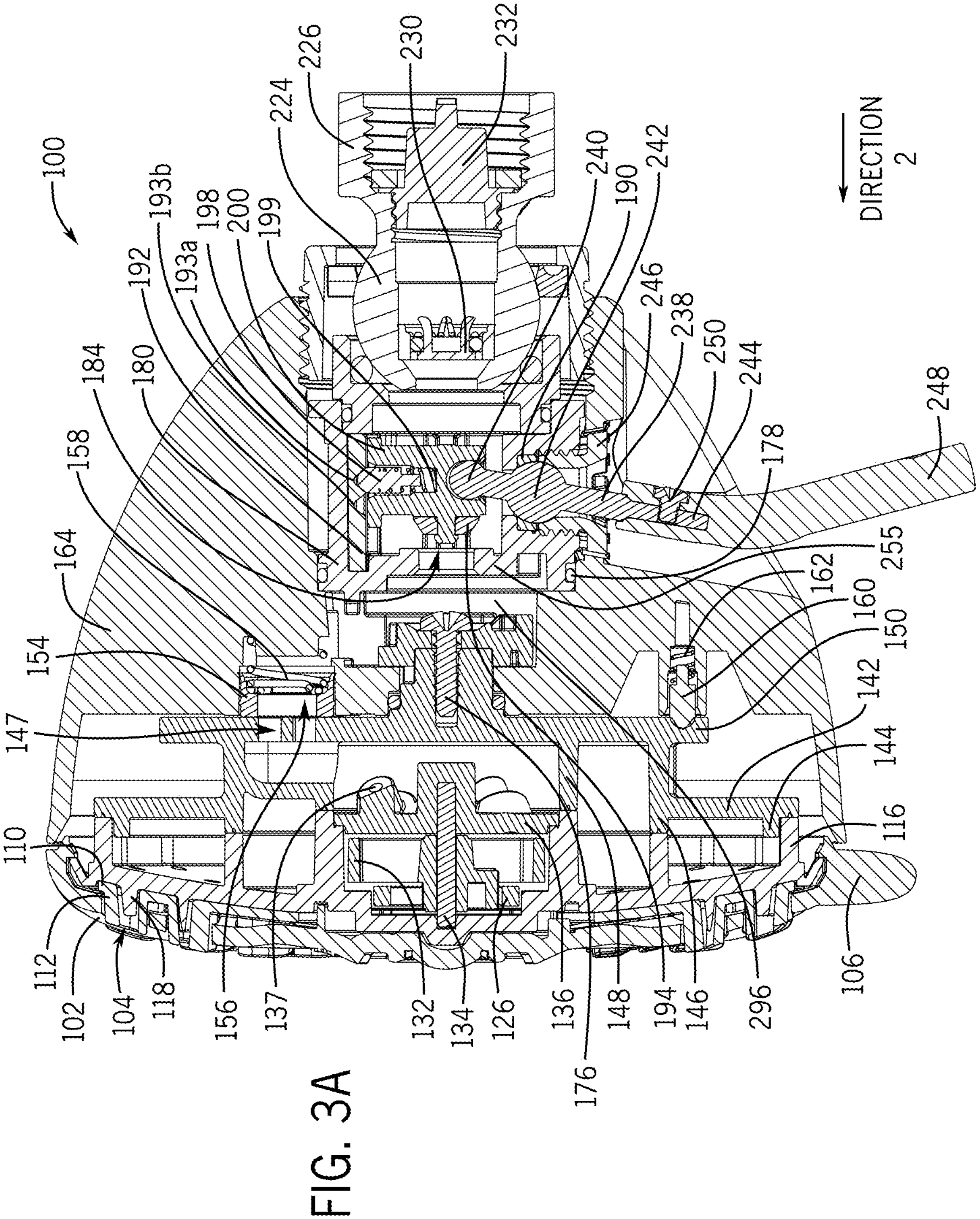
FIG. 3A is a cross-sectional view of the showerhead of FIG. 1A taken along line 3A-3A in FIG. 1B showing a pause lever in an open or flow position.
Figure 3B:
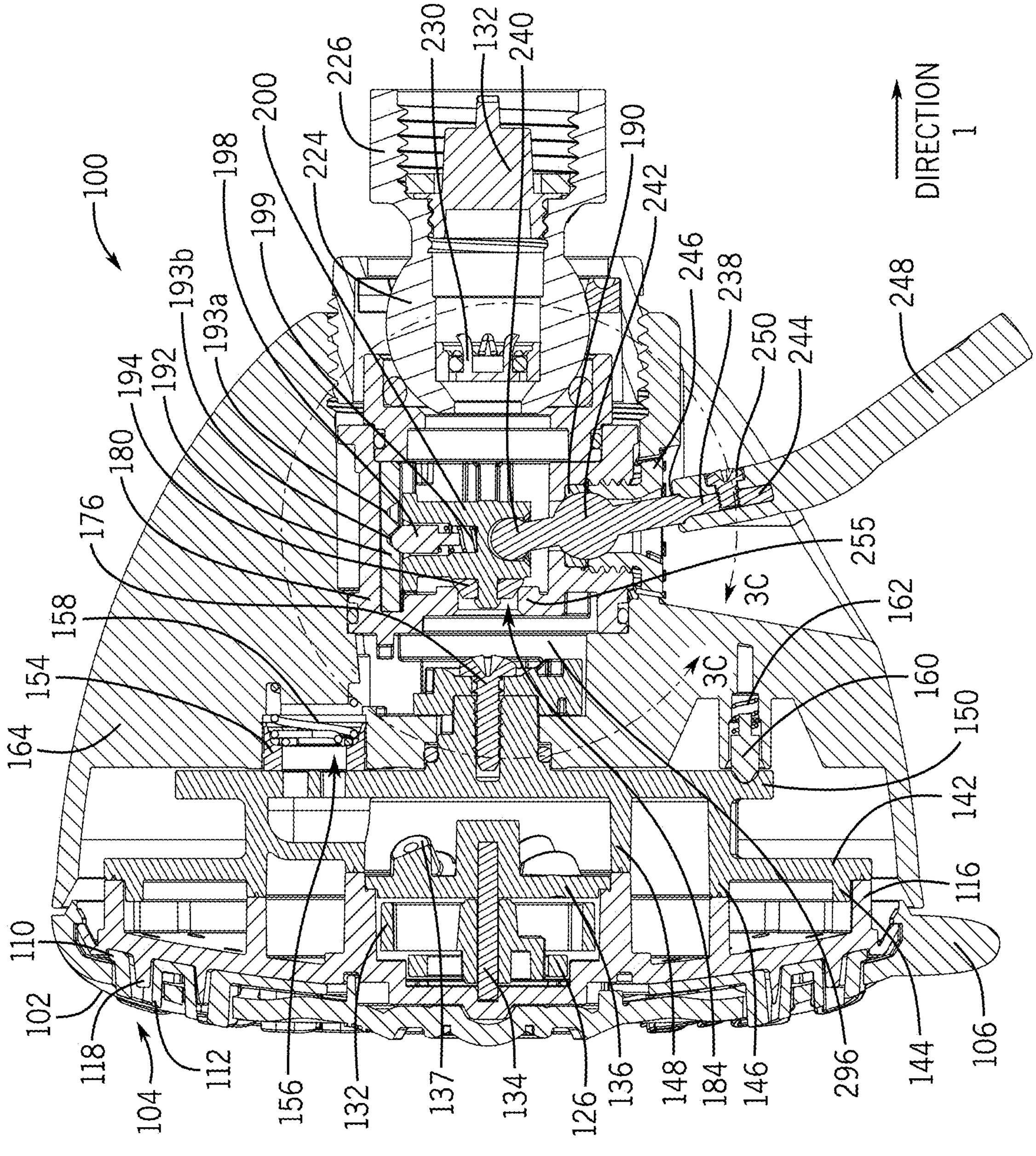
FIG. 3B is a cross-sectional view of the showerhead of FIG. 1A taken along line 3A-3A in FIG. 1B showing the pause lever in a closed or paused position.

Turning to the figures, the showerhead and pause assembly will now be discussed in more detail. FIGS. 1A-C are various views of the showerhead. FIG. 2 is an exploded view of the showerhead of FIG. 1A. FIGS. 3A-B are cross-section views of the showerhead of FIG. 1A with a pause lever in different positions. With reference to FIGS. 1A-3B, the showerhead 100 may include a showerhead housing 164, a showerhead engine 101, a water source attachment assembly 211, and a pause assembly 280. Each of the showerhead components will be discussed, in turn, below.

The showerhead housing 164 may include a mounting support structure 169, a housing attachment aperture 168, a detent cavity 166, a mode seal housing 170, and one or more connection tabs 172. The showerhead housing 164 defines an enclosure to house or receive various components of the showerhead, e.g., the engine 101. In some instances, the showerhead housing 164 may form a partial ovoid, oval, or conical shape, but many other shapes are envisioned. To that end, although the showerhead 100 is shown as a fixed mount showerhead, in other examples, the showerhead 100 may be handheld and the showerhead housing 164 may include additional features, such as an elongated handle or the like, extending from the engine housing portion. The showerhead housing 164 may include a back wall forming a back end of the housing that transitions into an outwardly extending sidewall that extends outwards and away from the back wall. The housing 164 terminates in an open end defining a housing compartment for receiving various components of the showerhead 100.

The mounting support structure 169 defines an internal scaffolding or other bracketing elements that can be used to support various components of the showerhead 100. The exact structure of the mounting support structure 169 likely will vary depending on the types and structure of the internal showerhead components. In one embodiment, the mounting support structure 169 includes two ribs extending from the back and side walls of the outer shell of the housing 164 that intersect forming a T or cross-shape; however, other shapes and number of ribs are contemplated.

The housing attachment aperture 168 may define an aperture through the mounting support structure 169 and may receive the keyed washer 174. The attachment aperture 168 may be defined through a central region of the mounting support structure 169 and has a generally circular shape. The housing attachment aperture 168 may also be defined through both the mounting support structure 169 and the back wall of the showerhead housing 164.

The detent housing 166 defines a cavity and may have a generally cylindrical shape. The detent housing 166 may be formed integrally with the showerhead housing 164 and extend from a back wall or sidewall thereof or in other embodiments may be a separate component attached to the showerhead housing 164. The detent housing 166 is variable in both shape and diameter depending on the configuration of the mode selection feedback elements.

The mode seal housing 170 receives the mode seal to secure it in place relative to the housing 164. The mode seal housing 170 may have a generally kidney shape and may define a compartment therethrough; however, the mode seal housing 170 may have other shapes, such as for example, an oval or rectangular shape. The size and shape of the mode seal housing 170 may depend on the desired flow rates of the showerhead and the attachment assembly 211.

The one or more connection tabs 172 may extend from an inner sidewall 165 of the showerhead housing 164 and extend longitudinal from the back wall towards the open end of the housing 164. The one or more connection tabs 172 may have an elongated body 171 with a front end 173 (i.e., the end facing the showerhead engine 101) extending further from the inner wall 165 than the elongated body 171; however, other configurations for connection tabs 172 are contemplated, such, as for example, a rectangular body extending from the inner wall 165.

The engine 101 defines flow paths through the showerhead 100 that result in different spray patterns or modes and may include a mode selector assembly and one or more spray plates. The engine 101 is positioned within the showerhead housing 164 and may include a face plate 102 enclosing the housing compartment. The showerhead engine 101 may be any general showerhead engine, such as, for example, the engine disclosed in U.S. Pat. No. 9,404,243, titled "Showerhead with turbine driven shutter." The structure of the engine 101 may vary depending on the desired spray patterns and modes of the showerhead 100, but in many embodiments includes two or more flow directing plates and optimally a massage engine.

In one embodiment, the showerhead engine 101 may include a face plate 102, a nozzle membrane 110, a nozzle plate 116, a massage mode assembly 125, and a back plate 142. The various plates may be secured together to define multiple flow paths therethrough.

The face plate 102 may have a generally circular shape with a plurality of nozzle receiving apertures 104 defined therethrough. The nozzle receiving apertures 104 may be located in concentric rings about a central aperture 108. The face plate 102 may include a mode actuator 106 extending from a peripheral edge of the face plate 102.

The nozzle membrane 110 may be a generally circular shape with a central opening 114, such that the nozzle membrane 110 forms a ring shape. The nozzle membrane 110 may include a plurality of nozzle receiving protrusions 112 extending from its outer surface. The nozzle membrane 110 may typically be formed of a rubber or other flexible material to allow easy removal of debris and/or build up from minerals and the like in the water source.

The nozzle plate 116 may have generally circular shape with a plurality of nozzles 118 extending from its surface. The nozzles 118 may be positioned in concentric rings about a central nub 122. The nozzle plate 116 may include a first nozzle array 120 and a second nozzle array 121 positioned on either side of the central nub 122. The nozzle plate 116 may also include a plurality of connection tabs 124 extending from a peripheral edge of the nozzle plate 116.

The massage mode assembly 125 may be used to generate pulsating flow through the nozzle arrays 120, 121. The massage mode assembly 125 may include a shutter 126, a turbine 132, a pin 134, and a jet plate 136. The shutter 126 may be a substantially planar disc having a generally oval shaped body with two parallel constraining edges formed on opposing ends and a cam aperture 128 defined through a central area of the shutter 126. In particular, the shutter 126 may have two relatively straight constraining edges formed at opposite ends from one another and two curved edges formed on opposite sides from one another. In one embodiment, the curved ends form the longitudinal edges for the shutter 126 and the constraining edges form the lateral edges. The cam aperture 128 may be a generally oval-shaped aperture. However, in other embodiments, the shutter 126 may be otherwise configured.

The turbine 132 may include a cam 130 and a plurality of blades 131 extending radially from the center of the turbine 132. The blades 131 may be connected by an outer rounded peripheral wall 133, but, it is contemplated that the outer rounded peripheral wall 133 may be omitted and the blades 131 may only be connected at the center of the turbine 132. The pin 134 may be an elongate cylindrical shape; however, the pin 134 may be any shape that allows another object to rotate about its axis. For example, the pin 134 may be a spindle, axle, dowel, or other similar connecting member. The jet plate 136 may be a generally circular shape with a plurality of jets 137 positioned on one side, as shown in FIGS. 3A-B. The other side of the jet plate 136, as shown in FIG. 2, may include a plurality of jet apertures 138 positioned around a pin receiving aperture 140. The pin receiving aperture 140 may be in a central position within the jet plate 136. As shown in FIG. 2, there may be three jet apertures 138 corresponding to three jets 137.

The back plate 142 forms a back wall of the engine 101 and includes the engine inlet or inlets. In some embodiments, the back plate 142 may be a generally circular shape and may include a plurality of interior walls or rims 144, 146, 148 that engage with corresponding walls or rims on the nozzle plate 116 (see FIG. 3A) to define flow paths through the engine 101 corresponding to different modes. An outer rim 144 extends around a periphery of the back plate 142 and may form a partial circular shape. A middle rim 146 may form a circle inside the outer rim 144 on the back plate 142. An inner rim 148 may form a circle inside the middle rim 146 on the back plate 142. A port 147 may be defined within the back plate 142 and be positioned between the middle rim 146 and the outer rim 144. As shown in FIG. 2, the port 147 is defined within a raised surface extending from the surface of the back plate 142. The back plate 142 may include multiple inlet apertures fluidly connected to the flow pathways defined between each of the rims 144, 146, 148 and the nozzle plate 116, with each inlet aperture being fluidly connected to a different flow path. The back plate 142 may also include a rear plate 150 extending from a rear surface of the back plate 142.

The mode selector assembly 155 selectively directs flow into one or more of the engine flow paths corresponding to a particular spray mode. The mode selector assembly 155 may include a mode seal 154, a seal 152, a plurality of biasing elements 158, 162, a mode detent 160, a keyed washer 174, and a fastener 176. The mode seal 154 acts to ensure fluid entering the engine 101 is delivered to the desired mode inlet aperture. The mode seal 154 may have a generally kidney shape; however, other shapes are contemplated, such as, for example, an oval or rectangular shape. The mode seal 154 has a mode aperture 156 defined therethrough and may be formed of a compressible material. The biasing element 158 may seat behind the mode seal within the showerhead housing 164. The biasing element 158 may be a wire or coil wrapped around a center axis, such as, for example, a spring.

The mode detent 160 may have a generally spherical or cylindrical shape, such as, for example, a ball or pin. The biasing element or mode spring 162 may seat behind the detent 160 in the showerhead housing 164 and may have a diameter that is slightly larger than a back end of the mode detent 160 to receive the mode detent 160. The keyed washer 174 may have a varying shape including a plurality of keyed protrusions, angled sidewalls, or other keying elements. The center of the keyed washer 174 may include a fastening aperture for receiving a fastener 176. The fastener 176 may be a screw or other threaded element or any other conventional fastener.

The attachment assembly 211 secures the showerhead 100 to a water source and may optionally allow the showerhead 100 to be repositioned relative to the water source. The water source attachment assembly 211 may include a plurality of seals 212, 220, 234, a pivot ball seat 214, a securing ring 222, a pivot ball 224, a regulator 230, a filter 232, and a bracket nut 236, each discussed below.

The seals 212, 220, 234 may be any conventional seal, such as for example, an O-ring or a U-cup, and may be of varying sizes. The pivot ball seat 214 defines an engagement surface for the pivot ball 224 and may have a generally cylindrical shape defining a pivot ball opening 217 therethrough. The pivot ball seat 214 may include one or more seal grooves 215 and a raised surface 216 extending therefrom. The raised surface 216 may include a plurality of prongs 218 extending therefrom.

The securing ring 222 provides a retention force and acts to help secure the pivot ball 224 in position. In one embodiment, the securing ring 222 may be a substantially complete ring, but may include a cutout such that the ring terminates in two open ends. The pivot ball 224 may have a generally spherical shape with a ball aperture 228 extending therethrough to define a flow passage through the ball. A threaded collar 226 extends from a distal end of the ball and may include a plurality of grooves on its outer surface and may include threads on its interior surface. The regulator 230 acts to reduce water flow through the device and may be omitted as needed. The filter 232 filters the water flow before entering the showerhead 100 and may be varied as desired, but in some embodiments may have a generally cylindrical shape with a plurality of grooves and apertures defined therethrough and a threaded collar 233 at one end. The bracket nut 236 may have a generally cylindrical shape with a circular opening defined therethrough and a plurality of grooves defining a threaded outer surface.

With reference now to FIGS. 2 and 4-8B, the pause assembly 280 will now be discussed in more detail. The pause assembly 280 pauses or stops water flow between the water source and the engine 101. The pause assembly 280 may include a valve body 180, a feedback assembly 281, a valve seal 194, a valve 200, a lever 238, a lever retainer 246, an actuator 248, and one or more seals 178, 190.

Figure 6A:
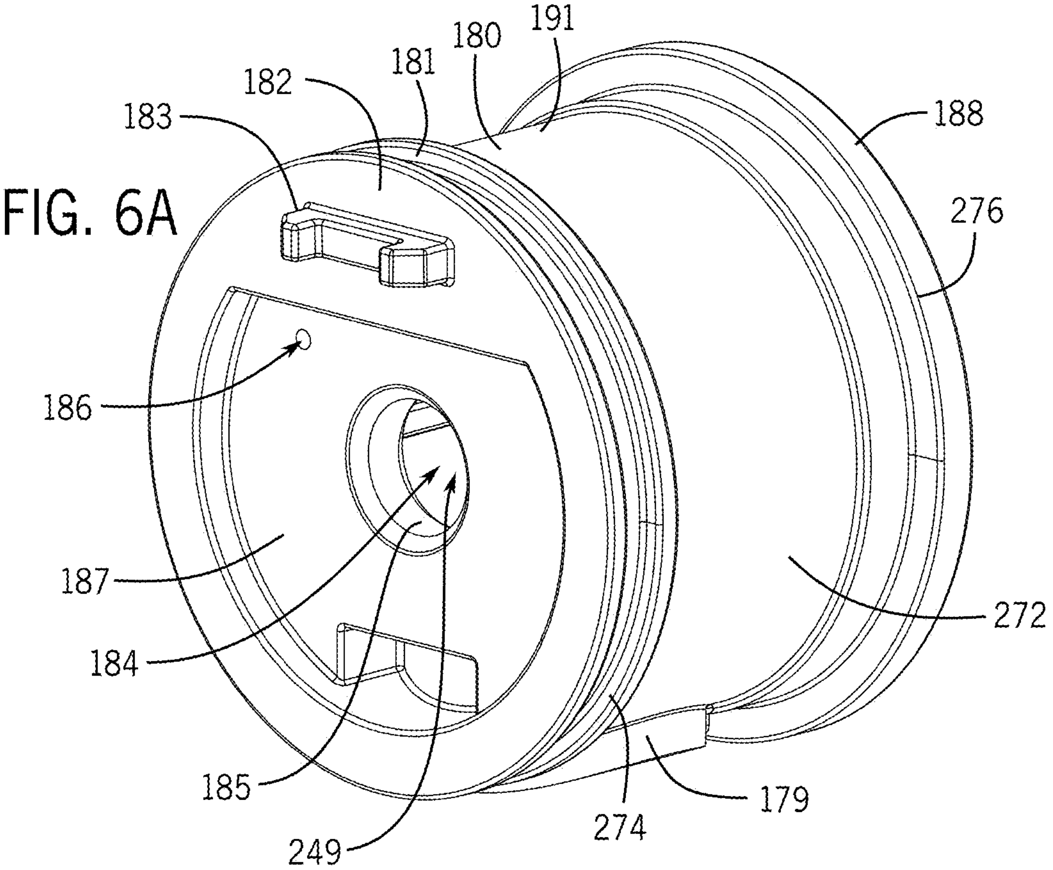
FIG. 6A is an isometric view of a valve body of the pause assembly of FIG. 4.
Figure 6B:
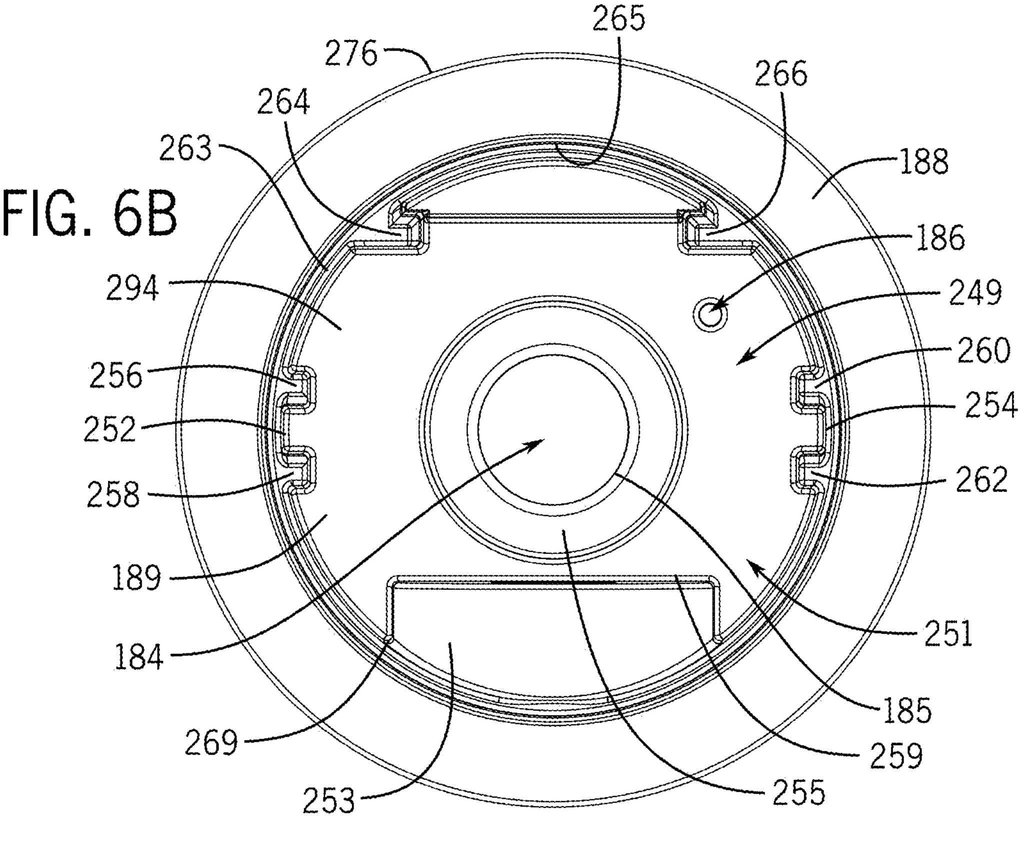
FIG. 6B is a rear elevation view of the valve body of FIG. 6A.

With reference to FIGS. 6A and 6B, the valve body 180 or valve housing defines a compartment for the valve 200 and various components of the valve assembly. In some embodiments, the valve body 180 may be a generally cylindrical shape with a main body 191 having an outer surface 272 that extends between two flange portions 274, 276, such that the outer surface 272 is recessed below an outer perimeter of the flange ends 274, 276. The front flange 274 forms a first end of the valve body 180 and defines a front wall 182 and the rear flange 276 forms a second end of the valve body 180 and remains open. The front flange 274 may define one or more seal grooves 181. The rear flange 276 defines a rear wall 188. The front wall 182 and rear wall 188 may each have a circular shape with a respective diameter larger than the diameter of the main body 191.

A valve body chamber 249 is defined by an interior surface of the valve body 180 and front wall 182. As shown in FIG. 6B, an interior surface 263 of the valve body 180 and the interior surface 294 of the front wall 182 form the valve body chamber 249. The front wall 182 may include a securing tang 183, which may include two laterally spaced prongs extending outwards from the front wall 182. The front wall 182 may include a recessed area 187 to reduce the weight of the valve body 180 and/or to provide additional space within the flow chamber 296 for injection molding; however, it is contemplated that the front wall 182 is a continuous surface or otherwise varied. A valve outlet 184 is defined through the front wall 182 and may be positioned within the recessed area 187 or another location on the valve body 180. The valve outlet 184 is in fluid communication with the valve chamber 249. As shown, the valve outlet 184 depicted is a generally circular shape; however, other shapes are contemplated.

One or more outlet engagement walls 185 define the valve outlet 184 and may be beveled or otherwise shaped to enhance the sealing engagement with the valve seal 194 discussed below. The front wall 182 may also define a trickle flow outlet 186 therethrough. The trickle flow outlet 186 may be a generally circular shape; however, other shapes are contemplated. The size and location of the trickle flow outlet 186 may be varied as desired. The trickle flow outlet 186 may have a substantially smaller diameter than the diameter of the valve outlet 184. For example, in one embodiment, the trickle flow outlet 186 may have a diameter between about 0.01"-0.07", while the valve outlet 184 may have a diameter between about 0.10"-0.50", depending upon the desired flow therethrough. The trickle flow outlet 186 may have a diameter that allows about 0.10-0.50 gpm of water to flow therethrough at 80 psig, while the valve outlet 184 may have a diameter that allows about 4-5 gpm of water to flow therethrough at 80 psig. In an example, the trickle flow outlet 186 may have a diameter of about 0.04", allowing about 0.30 gpm of water to flow therethrough at 80 psig, and the valve outlet 184 may have a diameter of about 0.28", allowing at least about 4.5 gpm of water to flow therethrough at 80 psig. It should be noted that the aforementioned ranges should not be considered limiting, and the diameter of the trickle flow outlet 186 and valve outlet 184 may vary. In some embodiments, the trickle flow outlet 186 is positioned in an upper end of the front wall 182 and is in fluid communication with the valve chamber 249. The trickle flow outlet 186 may be omitted to allow a full or complete water stoppage.

Figure 3C:
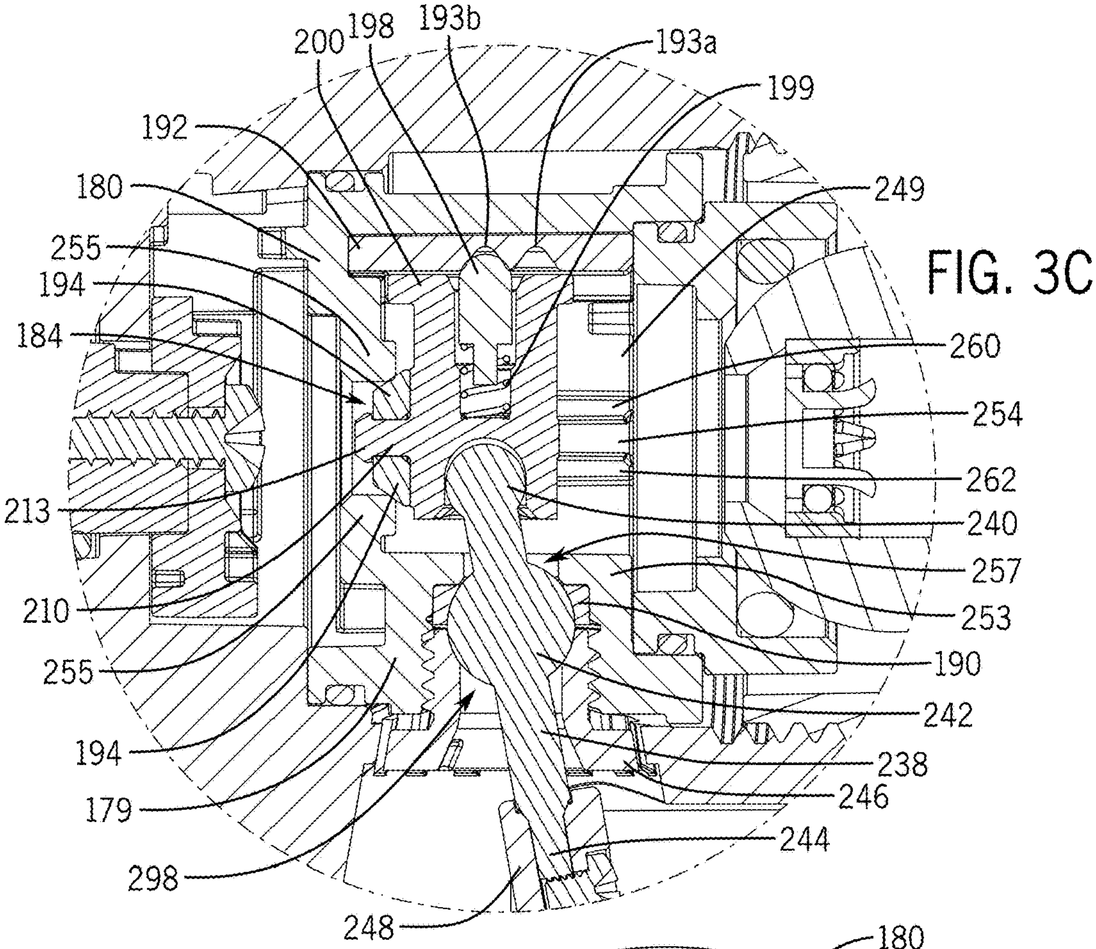
FIG. 3C is an isolated cross-sectional view of a pause assembly of FIG. 3B.
Figure 3D:
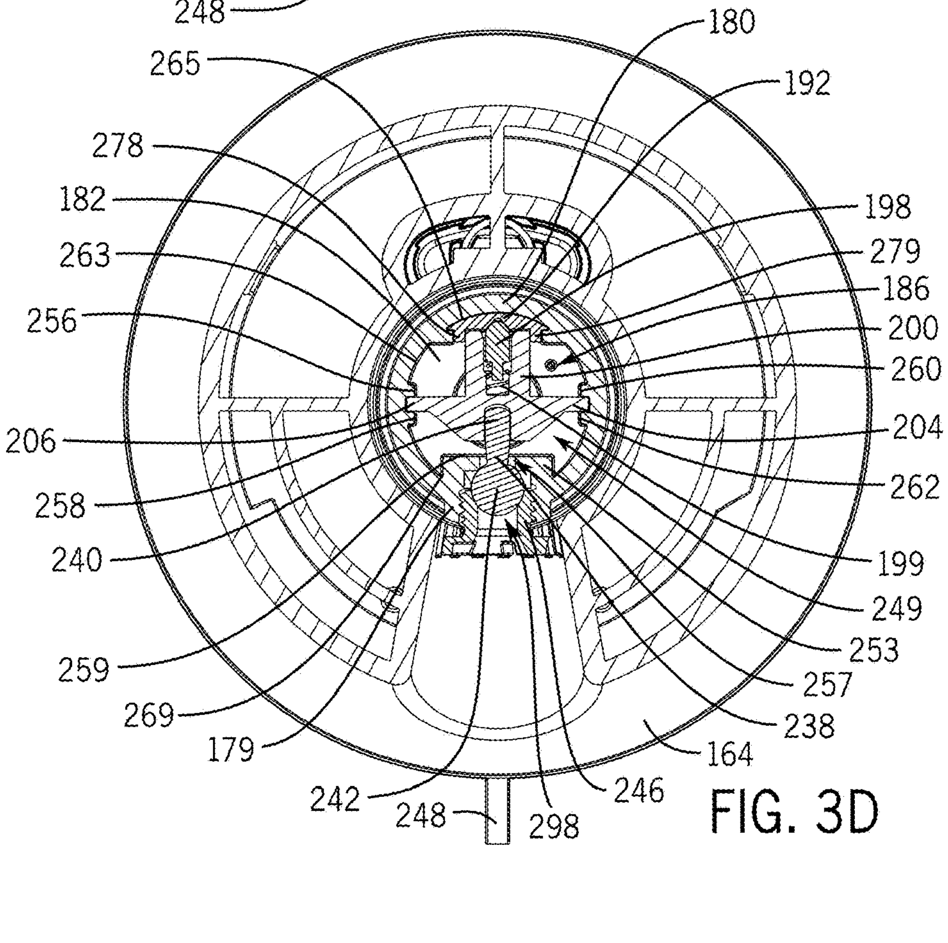
FIG. 3D is a cross-sectional view of the showerhead of FIG. 1A taken along the line 3D-3D in FIG. 1C.
Figure 4:
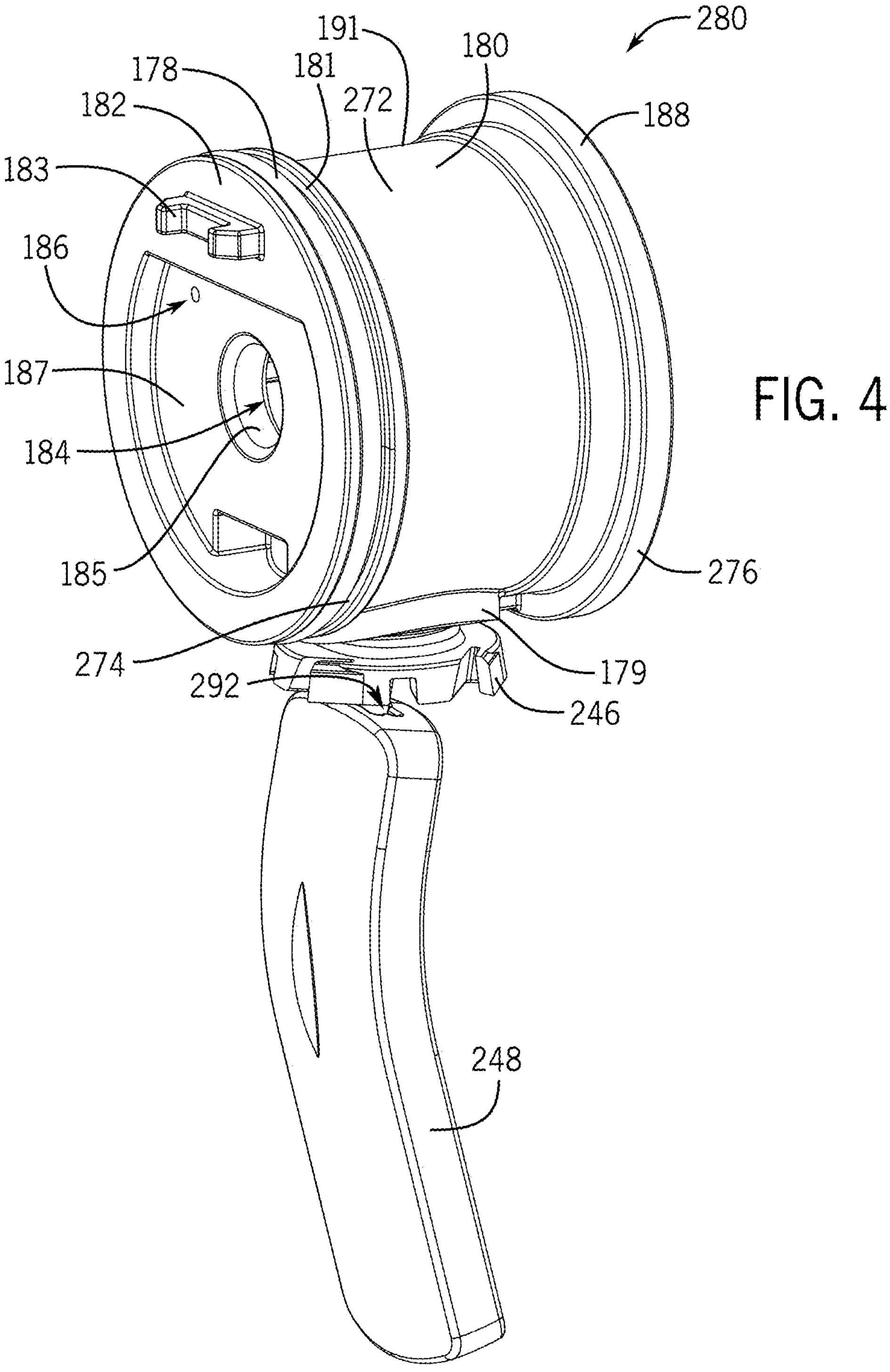
FIG. 4 is an isometric view of the pause assembly of the showerhead of FIG. 1A.

With reference now to FIGS. 3D and 6B, the rear flange 276 of the valve body 180 is open to define access to the body chamber 249. The interior surface 294 of the front wall 182 defines a valve seat 255, which forms a raised ring surrounding the valve outlet 184.

With reference to FIGS. 6A and 6B, the valve body 180 may include a guide track for the valve including a first track 252 and a second track 254 extending from the interior surface 263 on opposing sides of the valve body chamber 249. With reference to FIG. 6B, the first track 252 may include a first track upper wall 256 spaced apart from a first track lower wall 258 and the second track 254 may include a second track upper wall 260 spaced apart from second track lower wall 262. In this manner, the two tracks 252, 254 may define a groove between the respective upper wall 256, 260 and lower wall 258, 262. The tracks 252, 254 extend longitudinally along the length of the interior surface 263 of the valve body 180, e.g., the tracks 252, 254 may extend from the interior surface 294 of the front wall 182 along a portion of the interior surface 263 of the valve body 180.

The interior surface 263 may also include a plurality of brackets 264, 266 or rails extending therefrom. For example, a first upper surface bracket 264 and a second upper surface bracket 266 may extend from an upper surface 265 of the interior surface 263. As shown, the first upper surface bracket 264 is positioned on the same side of the valve body chamber 249 as the first track 252 and the second upper surface bracket 266 is positioned on the same side of the valve body chamber 249 as the second track 254. The brackets 264, 266 may extend from the interior surface 294 of the front wall 182 along a portion of the interior surface 263 of the vale body 180 and may extend the same distance along the interior surface 263 as the tracks 252, 254. As one example, the brackets 264, 266 may extend along the interior surface 263 of the main body 191.

With reference to FIGS. 3C and 3D, the valve body chamber 249 may also include a lever ball collar 253 extending upwards from a bottom surface 269 of the interior surface 263 of the valve body 180 and downwards past the exterior surface 272 of the valve body 180. The lever ball collar 253 may include a raised platform extending within the valve body 180 in the same direction and distance as the tracks 252, 254 and brackets 264, 266. As shown in FIG. 3D, the lever ball collar 253 may include an upper lever aperture 257 defined on an interior surface 259 of the lever ball collar 253. As shown in FIGS. 3D and 4-6A, the lever collar 253 extends outside of the valve body chamber 249 and defines a lever securing lip 179 defining a ball compartment 298 of the collar 253. The lever securing lip 179 may include threading on its interior surface.

The valve seal 194 engages the valve body 180 to selectively seal and unseal the valve outlet 184. As shown in FIGS. 2, 3A-C, and 5, the valve seal 194 may be a generally frustum shape having a convexly shaped skirt 282 terminating at a first end in a flat engagement face 196. The generally frustum shape with the engagement surface 196 and angled sidewalls may provide an enhanced seal allowing great variation in tolerances, while still providing a fluid tight seal, but other shapes of the valve seal 194 are also contemplated. The valve seal 194 may further include a post aperture 286 defined through a central portion. The valve seal 194 may typically be formed of a compressible or somewhat compressible material, such as rubber, silicone, and the like, which allows the seal 194 to deform or flex when engaging a surface, to ensure a tight seal.

The valve 200 supports the valve seal 194 and acts to move the seal between open and closed positions. As shown in FIGS. 7A-7F, the valve 200 may include a main body 201, a top end 202, a bottom surface 219, a first wing 204, a second wing 206, a first wing support 205, a second wing support 207, a seal seat surface 209, and a seal connecting post 210. The main body 201 may be generally cylindrically shaped defining a detent cavity 208 and a lever cavity 268, with the detent cavity 208 being defined on a first end of the body and the lever cavity 268 being defined on the second end. The two cavities may not be in communication with one another, but in other embodiments may be formed as a single integrated cavity.

Figure 7D:
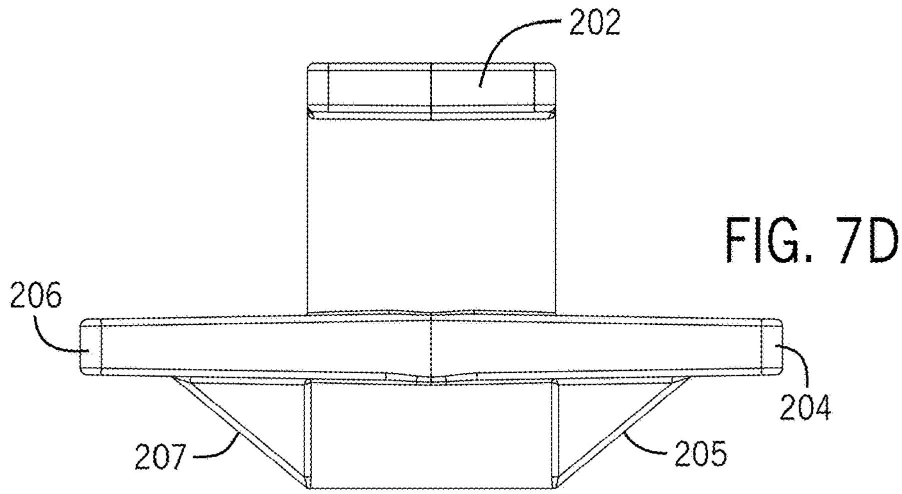
FIG. 7D is a rear elevation view of the valve of FIG. 7A.
Figure 7E:
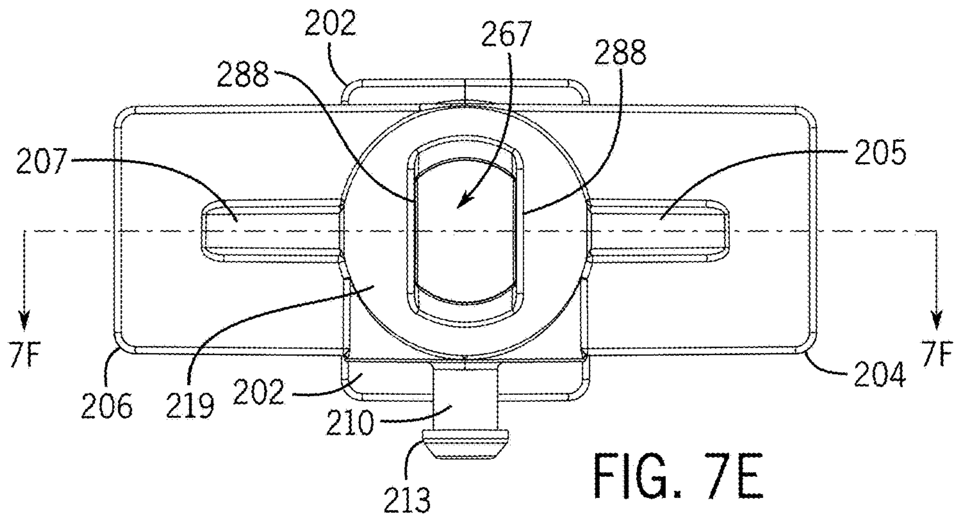
FIG. 7E is a bottom plan view of the valve of FIG. 7A.
Figure 7F:
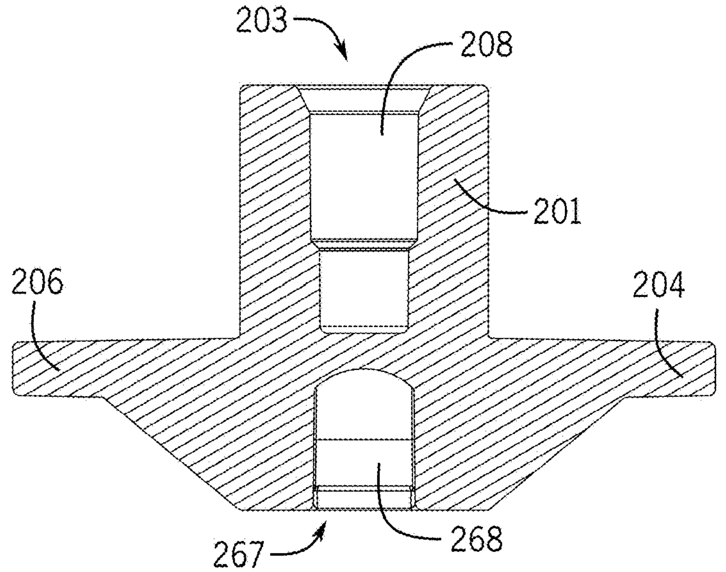
FIG. 7F is a cross-sectional view of the valve of FIG. 7A taken along line 7F-7F in FIG. 7E.

The top end 202 may extend from the top surface of the main body 201 and include a rectangular shape. The top end 202 may include a valve detent aperture 203 defining an opening into the detent cavity 208. Alternatively, the top end 202 may include one or more detent recess. As shown in FIG. 7E, the bottom surface 219 of the valve 202 may have a general circular shape and may define a connecting end aperture 267 that provides access to the lever cavity 268. The connecting end aperture 267 may have a generally oval shape but with two parallel constraining edges 288 forming opposing sides of the aperture 267 and extending into the cavity. The constraining edges 288 may extend longitudinally along the diameter of the main body 201 in a direction from a front side of the valve 200 (i.e., the side from which the seal connecting post 210 extends) to an opposite back side of the valve.

As shown in FIG. 7A, the wings 204, 206 may extend from a lower portion of the main body 201 on opposing sides thereof. The wings 204, 206 may each have a generally rectangular shape with a concave edge defined at the intersection with the main body 201. As shown in FIGS. 7C and 7E, the wings 204, 206 may have generally the same width and length. The top end 202 may have a length that is greater than the width of the wings 204, 206; however, the top end 202 may have a width that is generally the same length as the width of the wings 204, 206 and as the diameter of the main body 201. The wings 204, 206 may be supported by webbing forming one or more wing supports 205, 207. The webbing or wing supports 205, 207 may include a triangular shape and extend from a lower portion of the main body 201 to a bottom portion of the respective wing 204, 206.

As shown in FIG. 7A, the seal seat surface 209 of the valve 200 defines a seat for the seal 194 and may be defined between the wings 204, 206. In one embodiment, the seal seat surface 209 defines a flat and generally circular shaped surface. The seal post 210 may extend outwards from a central portion of the seal seat surface 209 and include a generally cylindrical shape with a barbed end 213.

As shown in FIGS. 2, 3A-D, and 5, the feedback assembly 281 may include a detent member 192, a detent 198, and a spring 199. The detent member 192 may be a plate with an upper face 195 and an engagement face 197 that may each define a rounded or flat surface. The engagement face 197 may have two tabs 278, 279 extending from opposing sides along a portion of a length of the plate. The detent member 192 may include a plurality of detent recess 193 *a,b* defined within the engagement face 197. As shown in FIGS. 3A-C, the engagement face 197 may define a first detent recess 193*a* and a second detent recess 193*b*; however, the detent member 192 may include more or less detent recess. In an alternate embodiment, the detent member 192 may instead include a detent cavity. The detent 198 may have a similar shape to the mode detent 160 previously described. While the detent 198 is depicted as a separate component, it is contemplated that the detent 198 may be integral with the valve 200.

Figure 8A:
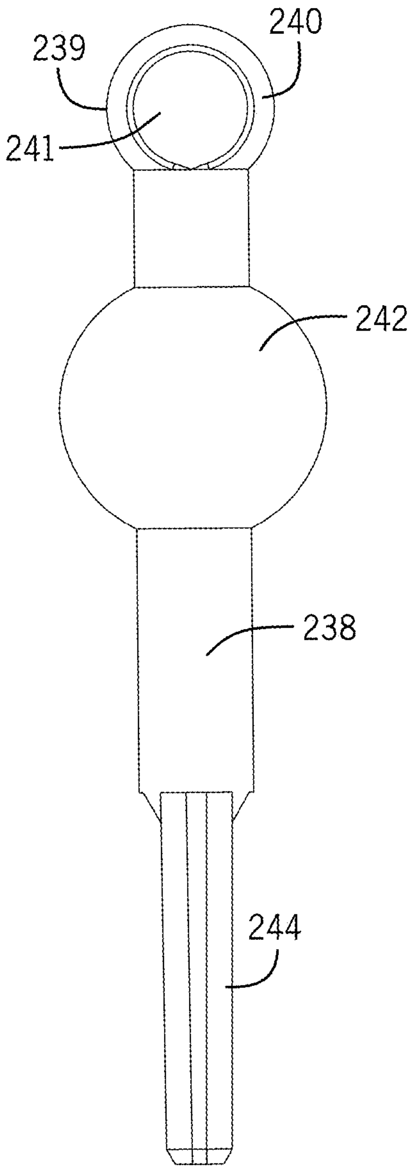
FIG. 8A is a side elevation view of a pause lever of the pause assembly of FIG. 4.
Figure 8B:
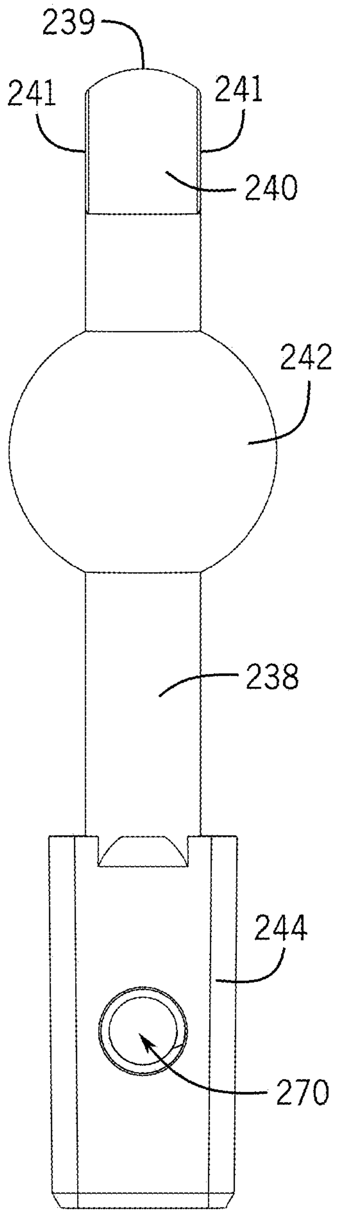
FIG. 8B is a front elevation view of the pause lever of FIG. 8A.

The lever 238 actuates the valve 200 to move it between various positions. With reference to FIGS. 8A and 8B, the lever 238 may have a generally elongated cylindrical shape with a connecting end 240, a lever ball 242, and a bottom end 244. The connecting end 240 may have a generally spherical shape with a rounded or pivot surface 239 and two keyed walls 241 or other keyed surfaces. The lever ball 242 may be spaced apart from the connecting end 240 and positioned on a central portion of the cylindrical portion of the lever 238. The lever ball 242 may be a generally spherical or cylindrical shape. The bottom end 244 may have a generally rectangular shape and may have a narrower depth than the diameter of the cylindrical portion of the lever 238. The bottom end 244 may include a fastening aperture 270, which may be threaded.

Figure 5:
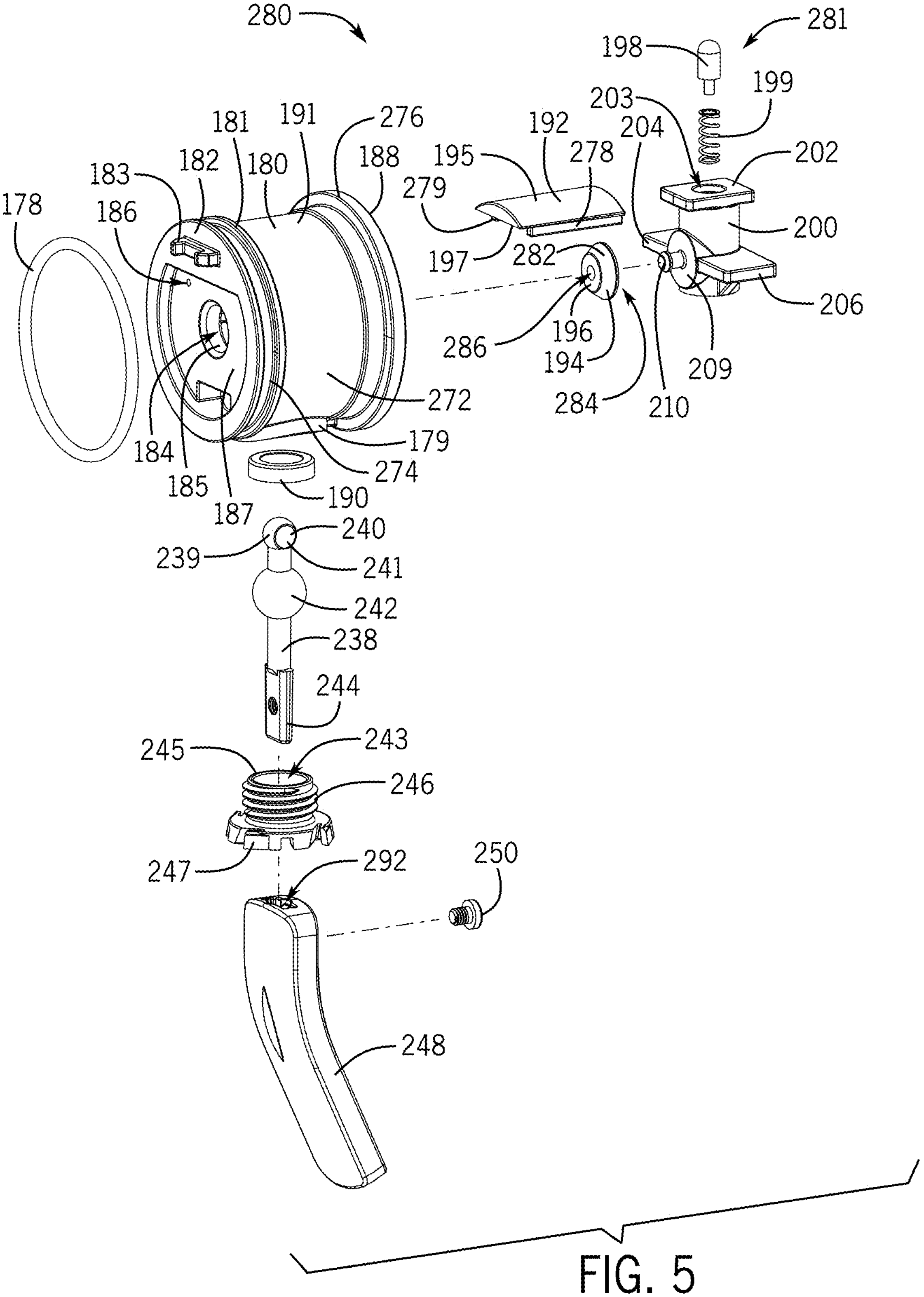
FIG. 5 is an exploded view of the pause assembly of FIG. 4.

As shown in FIG. 5, the lever retainer 246 may include a threaded end 245 and a securing end 247. The threaded end 245 may have a generally cylindrical shape with grooves on its outer surface. The securing end 247 may include a plurality of prongs and grooves. The lever retainer 246 defines a lower lever aperture 243 extending therethrough.

The handle 248 is configured to be gripped by a user to actuate the valve 200. In some embodiments, the handle 248 may be integrally formed with the lever 238. As the handle 248 defines an engagement surface to allow a user to actuate the valve, the handle 248 may be configured to be easily gripped by a user, and, in some embodiments, may form an elongated body. For example, the handle 248 may have a generally rectangular shape with curved corners and a slight curvature at its center; however, other shapes are contemplated. The handle 248 may have a bottom end aperture 292 defined within an upper surface (i.e., the surface closest to the lever retainer 246). The bottom end aperture 292 may have a generally rectangular shape. The bottom end aperture 292 may include prongs and/or tabs on opposing ends; however, other shapes are contemplated.

Additionally, in some embodiments, the handle 248 may define an inflection point along its length, where the extension of the handle 248 transitions from a first direction to a second direction, non-parallel to the first direction, e.g., the first direction may be vertical and the second direction may be between 25 to 60 degrees relative to the first direction extension. The inflection of the handle 248 may help to define an angled connection of the lever relative to the valve assembly.

Assembly of the Showerhead and Pause Assembly

With reference to FIGS. 2, 3A-3D, and 5, assembly of the showerhead 100 and pause assembly 280 will now be discussed in more detail. It should be noted that the below discussion is meant to be illustrative only and the specific assembly steps or operations may be done in any order. Generally, the showerhead engine 101 and the pause assembly 280 may be coupled to and positioned within the showerhead housing 164. The water source attachment assembly 211 may be coupled to the pause assembly 280 and the showerhead housing 164.

To assemble the showerhead engine 101, the nozzles 118 on the nozzle plate 116 are aligned and received within the nozzle receiving protrusions 112 on the nozzle membrane 110, which may be aligned and received within the nozzle receiving apertures 104 on the face plate 102, coupling the nozzle plate 116 to the nozzle membrane 110 and face plate 102. The massage mode assembly 125 may be arranged such that the cam 130 is received within the cam aperture 128 of the shutter 126. The pin 134 extends through the pin receiving aperture 140 on the jet plate 136, through the turbine 132 and cam 130, through the cam aperture 128, and is positioned within the central nub 122 on the nozzle plate 116, coupling the nozzle plate 116 to the massage mode assembly 125. The back plate 142 is coupled to the nozzle plate 116, nozzle membrane 110, and face plate 102, enclosing the massage mode assembly 125 between the back plate 142 and the face plate 102. The massage mode assembly 125 is positioned within the inner rim 148 of the back plate 142. The connection tabs 124 of the nozzle plate 116 facilitate alignment and attachment of the back plate 142 to the nozzle plate 116.

The mode seal 154 is positioned in front of the spring 158 within the mode seal housing 170. The mode spring 162 is received around part of the mode detent 160 and the mode detent 160 and mode spring 162 are then received in the detent housing 166. The seal 152 and the keyed washer 174 may be received within the housing attachment aperture 168 of the mounting support structure 169. The keyed washer 174 may align with a key (not shown) on the back plate 142 and the fastener 176 may be received from behind the keyed washer 174, extending through the key (not shown) to couple the showerhead engine 101 to the showerhead housing 164. The connection tabs 172 may help to align and couple the showerhead engine 101 to the showerhead housing 164.

The configuration of the pause assembly 280 will now be discussed in more detail. The detent member 192 may be coupled to the valve body 180 by the first and second upper surface brackets 264, 266, such that the upper face 195 of the detent member 192 engages with the upper surface 265 of the interior surface 263 of the valve body 180. However, in some embodiments, the detent member 192 and upper surface brackets 264, 266 may be omitted.

The spring 199 may be received around part of the detent 198 and the detent 198 and spring 199 may be received within the valve detent cavity 208 and arranged so as to bias the detent 198 away from the valve 200. The seal post 210 may couple the valve seal 194 to the valve 200. The post aperture 286 of the valve seal 194 may receive the seal post 210, such that the flat surface 284 of the valve seal 194 engages with the seal seat surface 209 of the valve 200 and the barbed end 213 of the seal post 210 protrudes from the engagement face 196 of the valve seal 194; however, it is contemplated that the seal post 210 may not protrude from the engagement face 196.

The valve 200 may be coupled to the valve body 180 by the first and second tracks 252, 254. For example, the second wing 206 may seat within the groove of the first track 252 created by the first track upper and lower walls 256, 258. The first wing 204 may seat within the groove of the second track 254 created by the second track upper and lower walls 260, 262. The top end 202 may be positioned between the first and second tabs 278, 279 of the detent member 192 and may engage with the engagement face 197 of the detent member 192. The detent 198 may protrude from the top end 202 of the valve 200 and may be positioned within one of the detent recess 193 *a,b* of the detent member 192. In the embodiment omitting the detent member 192, the upper surface 265 of the interior surface 263 of the valve body 180 may include one or more detent recess and the detent 198 may engage with the one or more detent recess on the upper surface 265. In the embodiment with the one or more detent recess located on the top end 202 of the valve 200, the configuration of the detent 198 and spring 199 may be reversed. For example, the detent 198 and spring 199 may be received within a detent cavity positioned on the detent member 192 and engage with the detent recess on the top end 202. In the embodiment omitting the detent member 192, the upper surface 265 of the interior surface 263 of the valve body 180 may include a detent cavity that may receive the detent 198 and spring 199. Other configurations of the detent and detent recess are contemplated and any number of detents may be used. As one example, the wings 204, 206 may have a plurality of detents that engage with detent recess on the side of the interior surface 263 of the valve body 180, such as, for example, within the tracks 252, 254.

When the valve 200 is positioned within the valve body 180, the valve seal 194 may engage with the valve seat 255, depending upon the position of the valve 200 within the valve body chamber 249. As best shown by FIG. 3C, when the convexly shaped skirt 282 of the valve seal 194 engages with the valve seat 255, it seals the valve body chamber 249 from the valve outlet 184.

The seal 178 may be placed within the seal grooves 181 on the front flange 274 of the valve body 180. The seal 178 may be any conventional seal, such as, for example, an O-ring, and may vary in size and thickness. The valve body 180 may be positioned within the showerhead housing 164 behind the showerhead engine 101, e.g., upstream from the showerhead engine 101. In the embodiment depicted in FIGS. 3A-C, the valve body 180 may be positioned behind the mounting support structure 169; however, other configurations are contemplated, such as, for example, with embodiments omitting the mounting support structure 169. The securing tang 183 may engage with walls of the mounting support structure 169. The valve body 180 may be spaced apart from the mounting support structure 169 creating a flow chamber 296 in front of the valve body 180 that fluidly couples the valve outlet 184 to the mode seal 154 and mode aperture 156, and subsequently to the showerhead engine 101. In this configuration, the pause assembly 280 may require a larger housing 164 than that required by conventional showerheads with engines, i.e., an extended length to accommodate the pause assembly 280. However, depending on the engine size and features, as well as the pause valve configuration, conventional showerhead housings may be used.

The connecting end 240 of the lever 238 may seat within the connecting end cavity 268 of the valve 200, defining a first ball and socket joint. The keyed walls 241 or surfaces of the connecting end 240 may align with the constraining edges 288 of the connecting end aperture 267 on the bottom surface 219 of the valve 200. This keyed connection secures the lever 238 to the valve 200. The lever 238 may be positioned at an angle relative to the valve 200. For example, the lever may be at a 45 degree angle or greater relative to the valve 200, such that an longitudinal extension direction of the lever may be non-parallel to the bottom surface of the valve 200. The angle may generally be between 20 to 90 degrees relative to a vertical axis defined through a center of the valve.

The lever 238 may extend through the valve body cavity 249, through the upper lever aperture 257 of the lever ball collar 253, and the lever ball 242 may at least partially seat inside the ball compartment 298 of the lever ball collar 253. The lever seal 190 and lever retainer 246 may each surround a portion of the lever ball 242 within the ball compartment 298, so as to define a second ball and socket joint for the showerhead. The lever seal 190 may be any conventional seal, such as, for example, an O-ring or U-cup, and may vary in size and thickness. The threading on the outer surface of the lever retainer 246 may engage with the threading on the interior surface of the lever securing lip 179 to seal the lever 238 at least partially inside the showerhead housing 164. The lever retainer 246 may form a tight engagement with the lever ball 242 to prevent water from leaking out of the pause assembly 280 and showerhead housing 164. A portion of the lever 238 may extend outside the showerhead housing 164. The bottom end 244 of the lever 238 may be received within the bottom end aperture 292 of the handle 248, which may be generally the same shape as the bottom end 244 of the lever 238 to receive the lever 238. The fastening aperture 270 on the lever 238 may align with a fastening aperture (not shown) on the handle 248, and a fastener 250 may be received within the two apertures, coupling the lever 238 to the handle 248. The fastener 250 may be a screw or other threaded element or any other conventional fastener.

The water source attachment assembly 211 may be positioned behind the pause assembly 280. The pivot ball seat 214 may be positioned within a portion of the valve body chamber 249, such as, for example, within the rear flange 276 portion. The seal 212 may be positioned within the seal groove 215, such that it seats in between the pivot ball seat 214 and the interior surface 263 of the valve body 180 when the pivot ball seat 214 is positioned within the valve body chamber 249. The prongs 218 of the pivot ball seat 214 may be positioned below and adjacent to the first and second upper surface brackets 264, 266 of the valve body chamber 249. The pivot ball 224 engages against the pivot ball seat 214 with the seal 220 partially surrounding the pivot ball 224 and positioned in between the pivot ball 224 and the pivot ball seat 214. The pivot ball 224 may also be positioned within the bracket nut 236 with the securing ring 222 partially surrounding a portion of the pivot ball 224 and positioned in between the pivot ball 224 and the bracket nut 236. The regulator 230 may seat inside the pivot ball 224, positioned in front of the filter 232, which may seat inside the threaded collar 226. The seal 234 may surround the filter 232 and may be positioned between the threaded collar 226 and the filter 232. The threaded collar 226 may protrude from a rear face of the showerhead housing 164 and may be attached to a water source such as, for example, a pipe or hose.

Operation of the Pause Assembly

The operation of the pause assembly 280 will now be discussed in more detail. Generally, depending on the positioning of the handle 248, the valve 200 changes or restricts flow from the pause assembly 280 to the engine 101, changing the output flow characteristics of the showerhead.

In operation, with reference to FIGS. 3A-3D, when the water source is turned on and the pause valve assembly is in an open position, water flows from the water source into the pivot ball 224 where it may flow through the filter 232 and regulator 230 and into the pause assembly 280 via the pivot ball seat opening 251 of the valve body 180. Water continues to flow through the valve body 180, around the valve 200, and through the valve outlet 184 and the trickle flow outlet 186 into the flow chamber 296 behind the engine 101. Water fills the flow chamber 296 and flows through the mode aperture 156 of the mode seal 154 to the engine 101. From there, water may be directed to two or more flow paths via the mode actuator 106 and mode selector assembly 155 based on the selected mode. To change spray modes, the user moves the mode actuator 106, rotating the engine 101 relative to the showerhead housing 164, and aligning different flow paths with the mode aperture 156, such that water flowing through the mode aperture 156 flows to different nozzles 118 associated with the different flow paths and modes.

To pause, or substantially reduce, the water flow through the showerhead 100, a user moves the handle 248 in a first or paused direction away from the front of the showerhead 100 (i.e., towards the water source attachment assembly 211). When the user moves the handle 248 in the first direction, the lever ball 242 rotates slightly in an opposite, or second direction, which in turn may cause a slight rotation of the connecting end 240 in the second direction within the connecting end cavity 268 of the valve 200 due to the keyed engagement of the lever/valve connection. The motion of the lever 238 in the second direction causes the valve 200 to move in the second direction towards the valve outlet 184. The constraining edges 288 of the connecting end aperture 267 and the keyed walls 241 of the connecting end 240 constrain the motion of the lever 238 and the valve 200 such that the motion of the lever 238 and the valve 200 are limited to move along a single plane or single axis. For example, the lever 238 and valve 200 may move along a longitudinal axis relative to a length of the showerhead (e.g., in a direction from the water source attachment assembly 211 towards the face plate 102) with motion restricted along a lateral axis (e.g., in a direction from the first track 252 to the second track 254, or vice versa). The motion of the valve 200 is also constrained in a vertical direction relative to the face of the showerhead (i.e., along a height of the valve body 180) by the tracks 252, 254 of the valve body 180 to prevent misalignment between the valve seal 194 and the valve outlet 184.

As the valve 200 moves in the second direction, the wings 204, 206 move along the tracks 252, 254 and the detent 198 moves from the first detent recess 193*a* to the second detent recess 193*b*. The detent 198 compresses the spring 199 within the detent cavity 208 to move out of the first detent recess 193*a*. The initial resistance provided by the spring 199 to move the detent 198 out of the first detent recess 193*a* prevents a user from unintentionally moving the handle 248 and repositioning the valve 200. The detent 198 remains in the biased position until the detent 198 is aligned with the second detent recess 193*b*, at which point the detent 198 clicks into place within the second detent recess 193*b*. The clicking sound of the detent 198 engaging with the second detent recess 193*b* as the user moves the handle 248 in the first direction indicates to a user that the valve 200 is positioned in the closed position, pausing, or substantially reducing, the flow of water through the showerhead 100.

When the valve 200 is in the closed or paused position, the valve 200 is positioned within the valve body 180 such that the valve seal 194 engages with the valve seat 255. As shown in FIG. 3B, the convexly shaped skirt 282 of the valve seal 194 compresses against the valve seat 255 such that the flat surface 196 of the valve seal 194 and the barbed end 213 of the seal post 210 seat within the valve outlet 184. The engagement of the valve seal 194 with the valve seat 255 creates a seal around the valve outlet 184, preventing water flow therethrough.

While the valve 200 may prevent water flow through the valve outlet 184, water may continue to slowly flow out the trickle flow outlet 186 into the flow chamber 296. The trickle flow outlet 196 prevents pressure build up within the pause assembly 280 and subsequent damage to the housing 164 in instances where the valve 200 is in the closed position for an extended period of time. The amount of water dispensed out the trickle flow outlet 196 may depend on the size of the trickle flow outlet 196. In one example, the diameter of the trickle flow outlet 196 may be selected to provide a minimal amount of flow out the trickle flow outlet 196 and be based on structural considerations of the showerhead 100 and water pressure of the water supply. For example, in some instances, the flow out of the trickle flow outlet substantially pauses the flow such that the flow through the trickle flow outlet may be less than 10%, and preferably between 5-7%, of the flow rate allowed through the valve outlet 184 and sometimes may be less than 10% and preferably less than 7% of the total flow rate through the showerhead in the open position. Depending upon the amount of time that the valve 200 is in the closed position and the size of the flow chamber 296, a minimal amount of water may be dispensed out of the showerhead 100 due to water flow through the trickle flow outlet 186. However, in embodiments where the trickle flow outlet 186 is omitted, water flow is entirely shut off by positioning the valve 200 in the closed or paused position.

To resume water flow through the showerhead 100, a user moves the handle 248 in a second direction towards the front of the showerhead 100 (i.e., towards the face plate 102). When the user moves the handle 248 in the second direction, the lever ball 242 rotates slightly in an opposite, or first, direction, which in turn may cause a slight rotation of the connecting end 240 in the first direction within the connecting end cavity 268 of the valve 200 due to the keyed engagement of the lever/valve connection. The motion of the lever 238 in the first direction causes the valve 200 to move in the first direction away from the valve outlet 184. The constraining edges 288 of the connecting end aperture 267 and the keyed walls 241 of the connecting end 240 constrain the motion of the lever 238 and the valve 200 such that the motion of the lever 238 and the valve 200 are limited to a single plane. For example, the lever 238 and valve 200 may move along a longitudinal axis (e.g., in a direction from the face plate 102 towards the water source attachment assembly 211) with motion restricted along a lateral axis (e.g., in a direction from the first track 252 to the second track 254, or vice versa). In one example, the motion is constrained in both the x and z axes, but able to move along the y axis. The motion of the valve 200 is also constrained in a vertical direction (i.e., along a height of the valve body 180) by the tracks 252, 254 of the valve body 180 to prevent misalignment between the valve seal 194 and the valve outlet 184.

As the valve 200 moves in the first direction, the wings 204, 206 move along the tracks 252, 254 and the detent 198 moves from the second detent recess **193*b* to the first detent recess 193*a*. The detent 198 pushes down on the spring 199 within the detent cavity 208 to move out of the second detent recess 193*b*. The initial resistance provided by the spring 199 to move the detent 198 out of the second detent recess 193*b* prevents a user from unintentionally moving the handle 248 and repositioning the valve 200. The detent 198 remains in the biased position until the detent 198 is aligned with the first detent recess 193*a*, at which point the detent 198 clicks into place within the first detent recess 193*a*. The clicking sound of the detent 198 engaging with the first detent recess 193*a* as the user moves the handle 248 in the second direction indicates to a user that the valve 200 is positioned in the open position, resuming the flow of water through the showerhead 100**.

When the valve 200 is in the open position, the valve 200 is positioned apart from the valve outlet 184, such that valve seal 194 is disengaged from the valve seat 255, allowing water to again flow through the pause assembly 280 and out the valve outlet 184 and the trickle flow outlet 186 to the showerhead engine 101. As discussed above, when water exits the valve outlet 184, it may flow through the flow chamber 296 and to the showerhead engine 101 where it may be dispensed in any number of showerhead modes, such as, for example, a constant flow mode or a pulsating flow mode, depending upon the positioning of the mode actuator 106.

While only two valve positions and water flow states (closed and open) are shown, various positions and states are contemplated. In the depicted embodiment, the valve 200 acts as a pause valve, pausing water flow at the direction of a user. However, it is contemplated that the valve 200 may be any other type of valve to interrupt water flow. For example, the valve 200 may be positioned to partially engage with the valve outlet 184 in a partially open position. Such positioning reduces flow, resulting in less water flow than when the valve 200 is in the full open position.

In an alternate embodiment, the valve body 180 may have several valve outlets instead of the single valve outlet 184. In this embodiment, when the valve 200 is in the closed position, it may only engage with some of the plurality of valve outlets, thus closing some outlets while leaving others open. Such a configuration may result in reduced water flow when the valve 200 is in the closed position, as opposed to disconnecting water flow. In this embodiment, the valve 200 may act as a conservation or pressure valve, reducing water flow, and subsequently water pressure, at the direction of a user. Similarly, although the valve 200 is shown as a linearly movable valve, in other examples, the valve 200 may be a spool valve or sliding shuttle type of valve. In these examples, motion by the lever 238 may be translated into rotation of the valve 200, where the rotation aligns a valve outlet with an engine inlet to vary the engine output flow characteristics. In yet another example, the feedback assembly positioned on the valve may be attached to the housing with the detent recesses formed on a top or bottom end of the valve body.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A showerhead comprising:

a housing defining a chamber in fluid communication with a fluid inlet and a plurality of nozzles; and a pause assembly at least partially received within the chamber and positioned between the fluid inlet and the plurality of nozzles to permit flow or substantially reduce flow from the fluid inlet to the plurality of nozzles, the pause assembly comprising:

a valve comprising a cavity defined within the valve; and a lever coupled to the valve and extending from the housing to define an external feature of the showerhead, wherein the lever comprises: a connecting end received within the cavity, wherein the connecting end defines a pivot surface and a keyed surface, wherein the pivot surface translates motion from the lever to the valve and the keyed surface limits a motion of the valve to an axis parallel to a first direction and a second direction;

wherein movement of the lever in the first direction moves the valve to a first position to permit flow from the fluid inlet to the plurality of nozzles;

movement of the lever in the second direction moves the valve to a second position to substantially reduce flow from the fluid inlet to the plurality of nozzles; and the lever and valve are constrained to a single plane and move along a longitudinal axis relative to a length of the showerhead, with the motion restricted along a lateral axis.

2. The showerhead of claim 1, wherein movement of the lever in the first direction causes the valve to move in the second direction.

3. The showerhead of claim 1, wherein:

the valve comprises an aperture defined at least partially by parallel constraining edges; and the lever engages the constraining edges of the valve such that any motion of the valve and lever is constrained to the single plane.

4. The showerhead of claim 3, wherein the connecting end comprises keyed walls, wherein an alignment of the keyed walls with the constraining edges results in constraining the motion.

5. The showerhead of claim 1, wherein movement of the lever in the second direction moves the valve to the second position to stop flow from the fluid inlet to the plurality of nozzles.

6. The showerhead of claim 1, wherein the lever and valve are coupled via one or more ball and socket joints.

7. The showerhead of claim 1, wherein the lever is coupled to the housing by a first ball and socket joint and is connected to the valve by a second ball and socket joint.

8. The showerhead of claim 1, wherein the pause assembly further comprises a valve body received within the chamber, wherein the valve is positioned within the valve body and movable relative thereto.

9. The showerhead of claim 8, further comprising a feedback mechanism comprising:

a detent member coupled to the valve body and defining a detent recess;

a detent coupled to the valve; and wherein the detent engages with the detent recess to provide feedback to a user.

10. The showerhead of claim 8, wherein the valve further comprises a valve seal seated on a first end of the valve, wherein in the first position the valve seal is spaced apart from an outlet of the valve body and in the second position the valve seal is positioned against so as to seal the outlet of the valve body.

11. The showerhead of claim 10, wherein the valve further comprises opposing tabs extending from either side thereof, wherein the opposing tabs interface with the valve body to constrain motion of the valve in at least one axis.

12. The showerhead of claim 11, wherein the opposing tabs interface with corresponding tracks defined by an interior surface of the valve body.

13. The showerhead of claim 12, wherein the corresponding tracks extend parallel to the first direction and the second direction.

14. The showerhead of claim 1, wherein the valve further comprises a valve seal on a first end thereof, and in the second position the valve seal seals the outlet of the valve body.

15. The showerhead of claim 1, wherein the showerhead provides an audible or haptic feedback to the user as the valve moves from the first position to the second position and vice versa.

16. The showerhead of claim 1, wherein the lever defines a handle for a user.

17. A showerhead comprising:

a housing defining a chamber in fluid communication with a fluid inlet and a plurality of nozzles; and a pause assembly at least partially received within the chamber and positioned between the fluid inlet and the plurality of nozzles to permit flow or substantially reduce flow from the fluid inlet to the plurality of nozzles, the pause assembly comprising:

a valve; and a lever coupled to the valve and extending from the housing to be gripped by a user, wherein the lever comprises: a connecting end received within the cavity, wherein the connecting end defines a pivot surface and a keyed surface, wherein the pivot surface translates motion from the lever to the valve and the keyed surface limits the motion of the valve to an axis parallel to the first direction and the second direction;

wherein movement of the lever in the first direction moves the valve to a first position to permit flow from the fluid inlet to the plurality of nozzles;

movement of the lever in the second direction moves the valve to a second position to substantially reduce flow from the fluid inlet to the plurality of nozzles; and the lever and valve are constrained to move along a first axis, with the motion restricted along a second axis orthogonal to the first axis.

18. A showerhead comprising:

a housing defining a chamber in fluid communication with a fluid inlet and a plurality of nozzles; and a pause assembly at least partially received within the chamber and positioned between the fluid inlet and the plurality of nozzles to permit flow or substantially reduce flow from the fluid inlet to the plurality of nozzles, the pause assembly comprising:

a valve; and a lever coupled to the valve and extending from the housing to define an external feature of the showerhead for gripping by a user, wherein the lever comprises: a connecting end received within the cavity, wherein the connecting end defines a pivot surface and a keyed surface, wherein the pivot surface translates motion from the lever to the valve and the keyed surface limits the motion of the valve to an axis parallel to the first direction and the second direction;

wherein movement of the lever in the first direction moves the valve to a first position to permit flow from the fluid inlet to the plurality of nozzles;

movement of the lever in the second direction moves the valve to a second position to substantially reduce flow from the fluid inlet to the plurality of nozzles; and the valve is configured to move along an axial direction triggered by a pivotal movement of the lever.

19. A showerhead comprising:

a housing defining a chamber in fluid communication with a fluid inlet and a plurality of nozzles; and a pause assembly at least partially received within the chamber and positioned between the fluid inlet and the plurality of nozzles to permit flow or substantially reduce flow from the fluid inlet to the plurality of nozzles, the pause assembly comprising:

a valve; and a lever coupled to the valve and extending from the housing, the lever and valve coupled via one or more ball and socket joints;

wherein movement of the lever in a first direction moves the valve to a first position to permit flow from the fluid inlet to the plurality of nozzles;

movement of the lever in a second direction moves the valve to a second position to substantially reduce flow from the fluid inlet to the plurality of nozzles; and the lever and valve are constrained to a single plane and move along a longitudinal axis relative to a length of the showerhead, with the motion restricted along a lateral axis.

20. A showerhead comprising:

a housing defining a chamber in fluid communication with a fluid inlet and a plurality of nozzles; and a pause assembly at least partially received within the chamber and positioned between the fluid inlet and the plurality of nozzles to permit flow or substantially reduce flow from the fluid inlet to the plurality of nozzles, the pause assembly comprising:

a valve; and a lever coupled to the valve and extending from the housing, the lever comprising a connecting end received within a cavity defined within the valve, the connecting end defining a pivot surface and a keyed surface;

wherein movement of the lever in a first direction moves the valve to a first position to permit flow from the fluid inlet to the plurality of nozzles;

wherein movement of the lever in a second direction moves the valve to a second position to substantially reduce flow from the fluid inlet to the plurality of nozzles;

wherein the lever and valve are constrained to a single plane and move along a longitudinal axis relative to a length of the showerhead, with the motion restricted along a lateral axis; and wherein the pivot surface translates motion from the lever to the valve and the keyed surface limits the motion of the valve to the longitudinal axis parallel to the first direction and the second direction.

* * * * *